US008077869B2

(12) United States Patent
Schantz et al.

(10) Patent No.: US 8,077,869 B2
(45) Date of Patent: Dec. 13, 2011

(54) ORGANIC KEYED ENCRYPTION

(75) Inventors: Howard J. Schantz, Inver Grove Heights, MN (US); Rick C. Stevens, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 780 days.

(21) Appl. No.: 12/100,020

(22) Filed: Apr. 9, 2008

(65) Prior Publication Data

US 2009/0257585 A1    Oct. 15, 2009

(51) Int. Cl.
*H04L 9/00* (2006.01)
*H04K 1/00* (2006.01)
*G06Q 20/00* (2006.01)

(52) U.S. Cl. ............................. 380/44; 380/270; 705/75

(58) Field of Classification Search ......................... None
See application file for complete search history.

(56) References Cited

U.S. PATENT DOCUMENTS

| 6,169,802 | B1 * | 1/2001 | Lerner et al. ..................... 380/44 |
| 6,978,367 | B1 | 12/2005 | Hind et al. |
| 2005/0021774 | A1 | 1/2005 | Kurihara et al. |
| 2006/0041794 | A1 | 2/2006 | Aaron |
| 2008/0310634 | A1 * | 12/2008 | Pavlovic ........................ 380/270 |
| 2010/0332400 | A1 * | 12/2010 | Etchegoyen ..................... 705/75 |

FOREIGN PATENT DOCUMENTS

| JP | 2007-74506 A | 3/2007 |
| WO | WO 2007/124089 A2 | 11/2007 |
| WO | WO 2007124089 A2 * | 11/2007 |

OTHER PUBLICATIONS

Khandel Wal, Vivek. "Anti-Counterfeiting Using "Uncloneable" RFIDs." accessed Aug. 11, 2008 from http://autoid.mit.edu/ConvocationFiles/PUFCO_—_AntiCounterfeiting_Using_Unclonable_RFIDs%5B1%5D.pdf; p. 7 of the document contains the date of Apr. 18, 2007.
International Search Report of PCT/US2009/031188, dated Sep. 1, 2009.
Written Opinion of the International Searching Authority of International Application No. PCT/US2009/031188, dated Sep. 1, 2009.

* cited by examiner

*Primary Examiner* — Shin-Hon Chen
(74) *Attorney, Agent, or Firm* — Hamre, Schumann, Mueller & Larson, P.C.

(57) ABSTRACT

An encryption technique that creates a unique encryption key or fingerprint based on unique physical and electrical characteristics of a target electronic assembly to be protected. The encryption key can be constructed by exploiting the manufacturing variances present in all electronic elements including active elements and passive elements. Active elements include, for example: oscillators/clocks, internal I/O controllers, external I/O controllers, memory, processors, and digital power converters. Passive elements include, for example: internal I/O interconnects, external I/O interconnects, memory buses, and power buses. The encryption key can also include one or more environmental condition thresholds.

11 Claims, 2 Drawing Sheets

ORGANIC KEYED ENCRYPTION

FIELD

This disclosure relates to encryption techniques, in particular to a technique that exploits physical and electrical characteristics of one or more active and/or passive hardware elements of an electronic assembly to create encryption key material.

BACKGROUND

In some electronic assemblies, measures are taken to protect the electronics from tampering and to protect stored data. It can be difficult to detect unauthorized tampering with an electronic assembly, such as replacement of an element, as the replacement element often appears to be identical to the replaced element. To prevent unauthorized data access, passwords or other methods are used to ensure that only those with the correct password can access the data stored in the electronic assembly.

SUMMARY

An encryption technique that creates a unique encryption key or fingerprint based on unique physical and electrical characteristics of a target electronic assembly to be protected. The disclosed technique can be used in any security related application that relies upon the use of encryption including, but not limited to, the anti-tamper and information-assurance domains to protect data-at-rest from reverse engineering. Data-at-rest can be found in a number of applications, for example a field programmable gate array (FPGA) or non-volatile random access memory (NVRAM).

The encryption key can be constructed by exploiting the manufacturing variances present in all electronic hardware elements including, but not limited to, active elements and passive elements. Active elements can include, but are not limited to, for example: oscillators/clocks, internal I/O controllers, external I/O controllers, memory, processors, and digital power converters. Passive elements can include, but are not limited to, for example: internal I/O interconnects, external I/O interconnects, memory buses, and power buses.

The technique described herein can be used to generate a unique encryption key based on the unique fingerprint that each element has, even if all elements are constructed from the same manufacturing lot. For example, if one were to measure the specific impedances and the propagation delays of transistors within the traces and integrated circuits of an electronic assembly, they would each be different even though they are constructed using the same materials, possibly from the same manufacturing wafer or lot.

The disclosed technique will ensure that data at rest, for example in a non-volatile memory, when protected by encryption, can be decrypted only by the correct collection of electronic hardware elements having the correct key or fingerprint. Any replacement or change in hardware element(s) will cause the key to not match, thereby preventing decryption and access to the data such as by shutting down the device or similar non-destructive penalty. Alternatively, a destructive penalty could be invoked resulting in inhibiting any further decryption attempts. A suitable warning can also be generated indicating a potential problem.

In one embodiment, a method of creating an encryption key of an electronic assembly comprises measuring a plurality of active and/or passive electronic performance factors of one or more elements of the electronic assembly, and combining the measured electronic performance factors to create the encryption key.

In another embodiment, the encryption key can comprise a sequence of bits constructed from a plurality of measured active and/or passive electronic performance factors of one or more elements of the electronic assembly.

DRAWINGS

DETAILED DESCRIPTION

Figure 1:
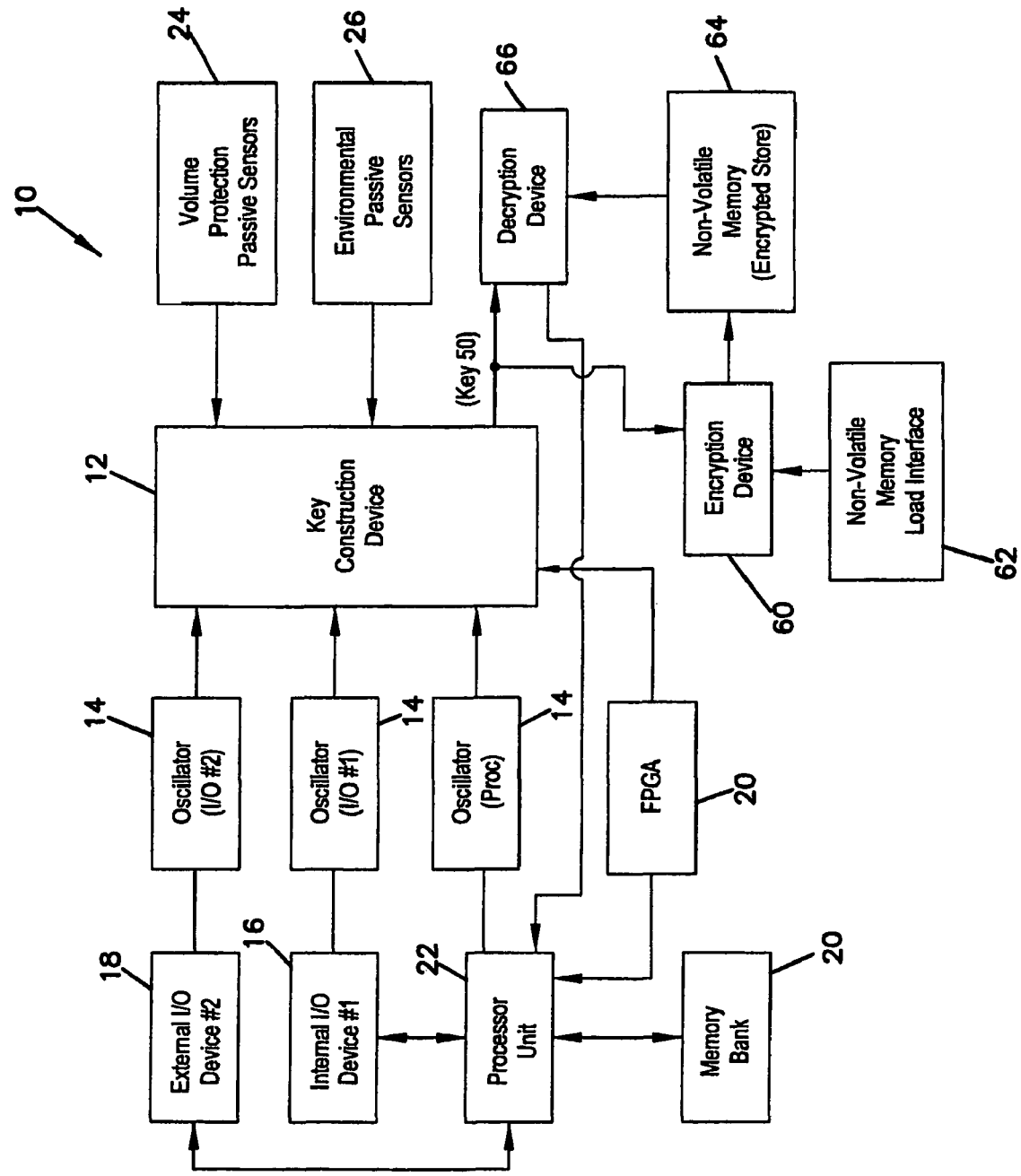
FIG. 1 is a block diagram of an exemplary electronic assembly used to create the unique encryption key.

With reference to FIG. 1, an exemplary electronic assembly 10 in the form of a single board computer is schematically illustrated. As used throughout this specification and claims, the term "electronic assembly" or just "assembly" refers to at least two hardware elements that are assembled into a complete electronics structure or unit. Examples of an assembly include, but are not limited to, for example: the single board computer described herein, an integrated circuit with functional blocks, a computer with multiple boards, and a system of networked computers. The concepts described herein can be applied to any electronic assembly, whether the assembly is a single piece of hardware or multiple pieces of hardware.

The assembly 10 includes a key construction device 12 that will create an encryption key based on a plurality of inputs. Inputs into the key construction device 12 include one or more performance thresholds measured from active electronic elements which typically have a high degree of manufacturing variability as well as performance thresholds measured from passive electronic elements.

Active electronic elements include, but are not limited to, oscillators 14 and clocks, internal I/O controllers 16, external I/O controllers 18, volatile/non-volatile memories 20, processors 22, and digital power converters. One exemplary way of generating the performance thresholds is to utilize pulse trains that grade the delay and thresholding of one or more of the active electronic elements as related to the associated passive interconnect. However, other techniques that are suitable for measuring unique performance thresholds of the active electronic elements can be utilized.

Passive electronic elements include, but are not limited to, internal I/O interconnects, external I/O interconnects, memory buses, and power buses. One exemplary way of generating these performance thresholds is to utilize very fine resolution of time and electrical amplitude parameters to signature these interconnects between elements. Additionally, these parameters can be measured so finely that any attempts to monitor their operation will modify the resulting key such that decryption will be unsuccessful. However, other techniques that are suitable for measuring unique performance thresholds of the passive electronic elements can be utilized.

Optional inputs into the key construction device 12 include environmental measurements taken by, for example, one or more volume protection sensors 24 and environmental sensors 26. The environmental measurements can then be compared against established environmental condition thresholds that are input into the key construction device 12 and become part of the key. Examples of environmental condition thresholds include temperature, shock, radiation such as x-rays, humidity, g-forces, and sound level. The environmental conditions can be actively measured by the sensors 24, 26 continuously during operation, and compared against the set thresholds. If one of the set thresholds is exceeded, the electronic assembly is prevented from operating. The threshold limits can also be latched using passive sensors for off-state detection.

Figure 2:
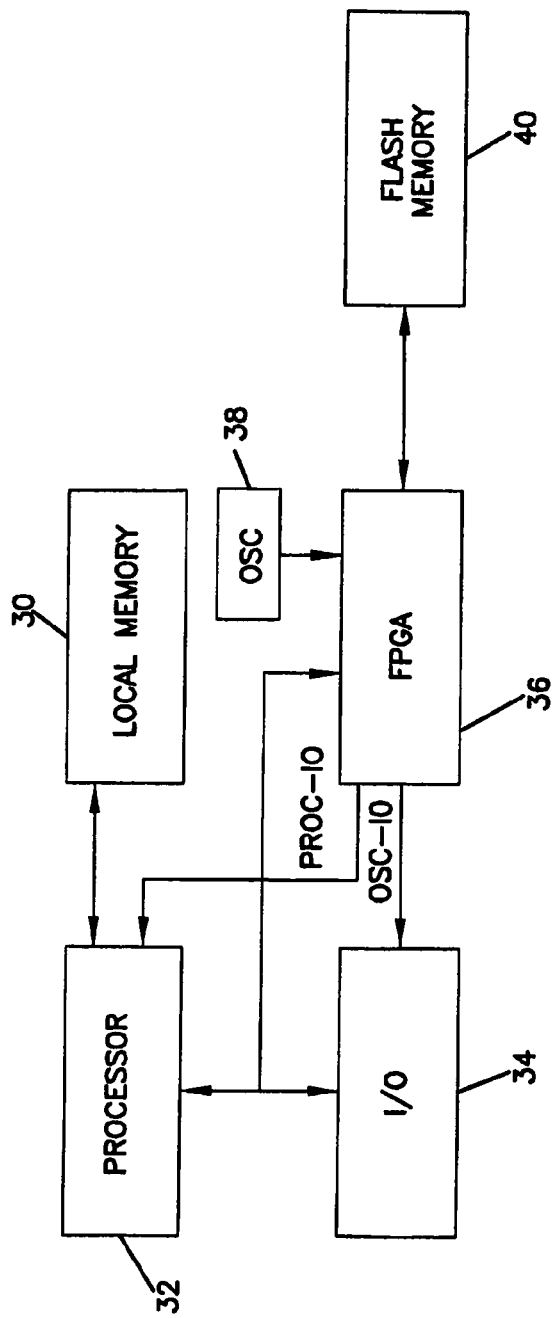
FIG. 2 is a block diagram of a specific exemplary technique of creating the unique encryption key.

An exemplary technique of creating the unique encryption key is depicted in FIG. 2. First, programs are loaded into the processor memory 30 from non-volatile memory 40 that exercise the logic in the processor 32, memory 30, I/O 34, oscillator 38 and the Field Programmable Gate Array (FPGA) 36. Then, one individually adjusts a variety of electrical parameters associated with the external interconnects, including, but not limited to, oscillator 38 frequency, duty-cycle, and rise/fall, until the performance thresholds of the integrated circuits are detected. For example, the oscillator 38 frequency, duty-cycle, amplitude, rise/fall time and frequency jitter could be adjusted to find the specific operating thresholds for the processor 32, local memory 30, I/O 34, non-volatile memory 40 and FPGA 36 elements. Thereafter, this information is integrated into a key that is used to decrypt the non-volatile memory 40.

Figure 3:
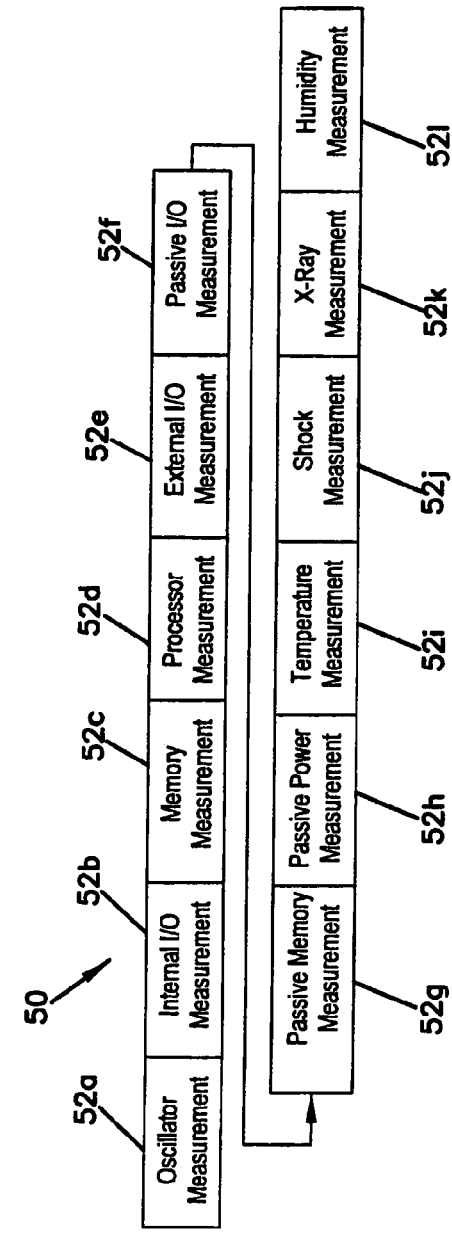
FIG. 3 depicts an exemplary key construction.

FIG. 3 depicts an exemplary construction of a key 50. The key 50 is constructed from a plurality of sub-key pieces 52a . . . 52l, each piece, containing one or more bits of information, comprising one of the measured active and/or passive electronic performance factors or one of the environmental thresholds. The key 50 can be constructed from one or more of the following sub-key pieces:

Sub-key 52a—oscillator measurement
Sub-key 52b—internal I/O measurement
Sub-key 52c—memory measurement
Sub-key 52d—processor measurement
Sub-key 52e—external I/O measurement
Sub-key 52f—passive I/O measurement
Sub-key 52g—passive memory measurement
Sub-key 52h—passive power measurement
Sub-key 52i—temperature measurement
Sub-key 52j—shock measurement
Sub-key 52k—x-ray measurement
Sub-key 52l—humidity measurement.

Other keys using more or less sub-keys, performance factors and/or environmental thresholds can be constructed.

Returning to FIG. 1, once the key construction device 12 constructs the key 50, the key is provided to an encryption device 60 which encrypts the data in memory through the load interface 62. The encrypted data is stored in non-volatile memory 64. For example, in a typical application, data loaded into the non-volatile memory 64 is done once during manufacturing.

When one wishes to access data from the memory, the data must first be decrypted in a decryption device 66. The key construction device 12 provides the key 50 to the decryption device 66. If the key is the correct key, the decryption device 66 decrypts the data and then sends it to the processor 22 for operational use. If the key is incorrect, the data cannot be decrypted. An incorrect key can signal a number of possible issues, including, for example: that one or more elements of the board of the electronic assembly 10 have been replaced; that the entire board has been replaced; and/or that one or more of the environmental thresholds as measured by the volume sensors or the environmental sensors has been exceeded. If the key does not match, then access to the data can be prevented. For example, one penalty of the key not matching is that the electronic assembly can be powered down to prevent operation. At the same time, a warning can be generated to warn of a possible problem.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of creating an encryption key of an electronic assembly, comprising:
    measuring a plurality of active and/or passive electronic performance factors of one or more elements of the electronic assembly, the active electronic performance factors are measured from one or more of the following active elements: an oscillator, an internal I/O controller, an external I/O controller, a memory, a processor, and a digital power converter, and wherein measuring the active electronic performance factors comprises generating pulse trains that grade the delay and thresholding of the active elements; and
    creating the encryption key from the measured electronic performance factors.

2. A method of creating an encryption key of an electronic assembly, comprising:
    measuring a plurality of active and/or passive electronic performance factors of one or more elements of the electronic assembly, the passive electronic performance factors are measured from one or more of the following passive elements: an internal I/O interconnect, an external I/O interconnect, a memory bus, and a power bus, and wherein measuring the passive electronic performance factors comprises using a time domain reflectometry technique to determine thresholds of the passive elements; and
    creating the encryption key from the measured electronic performance factors.

3. A method of creating an encryption key of an electronic assembly, comprising:
    measuring a plurality of active and/or passive electronic performance factors of one or more elements of the electronic assembly; and
    creating the encryption key from the measured electronic performance factors, the encryption key includes at least one environmental condition threshold.

4. The method of claim 3, wherein the environmental condition threshold comprises one or more of temperature, shock, x-ray, humidity, g force, and sound level.

5. An electronic assembly, comprising:
    a plurality of active electronic elements and a plurality of passive electronic elements cooperatively assembled to form an electronic structure;
    a key construction device connected to the active electronic elements to receive inputs from the active electronic elements pertaining to at least one electronic performance factor of the active electronic elements, and the key construction device constructs an encryption key that includes a sequence of sub-key pieces constructed from the electronic performance factors of the active electronic elements.

6. The electronic assembly of claim 5, wherein the key construction device is also connected to the passive electronic elements to receive inputs from the passive electronic elements pertaining to at least one electronic performance factor of the passive electronic elements, and the sequence of sub-key pieces includes a plurality of electronic performance factors of the active electronic elements and a plurality of electronic performance factors of the passive electronic elements.

7. The electronic assembly of claim 5, wherein the active electronic elements comprise one or more of the following: an oscillator/clock, an internal I/O controller, an external I/O controller, a memory, a processor, and a digital power converter.

8. The electronic assembly of claim 5, wherein the passive electronic elements comprise one or more of the following: an internal I/O interconnect, an external I/O interconnect, a memory bus, and a power bus.

9. The electronic assembly of claim 5, further comprising at least one environmental sensor connected to the key construction device and providing an input to the key construction device pertaining to a measured environmental condition, and the sequence of sub-key pieces of the encryption key comprises the measured environmental condition.

10. The electronic assembly of claim 9, wherein the environmental sensor measures temperature, shock, x-ray, humidity, g force, or sound level.

11. The electronic assembly of claim 5, further comprising an encryption device and a decryption device connected to the key construction device.

* * * * *